United States Patent [19]

Bräutigam et al.

[11] Patent Number: 5,123,881
[45] Date of Patent: Jun. 23, 1992

[54] FLEXIBLE ENDLESS BELT FOR FULL-TRACK VEHICLE

[75] Inventors: Jürgen Bräutigam, Hanover; Heinz Lause, Recklinghausen, both of Fed. Rep. of Germany

[73] Assignees: Continental Aktiengesellschaft, Hanover; Intertractor Viehmann GmBH & Co., Gevelsberg, both of Fed. Rep. of Germany

[21] Appl. No.: 729,384

[22] Filed: Jul. 12, 1991

[30] Foreign Application Priority Data

Jul. 17, 1990 [DE] Fed. Rep. of Germany ....... 4022682

[51] Int. Cl.⁵ ................................................ F16G 1/04
[52] U.S. Cl. ...................................... 474/268; 474/205
[58] Field of Search ............. 474/205, 268, 202, 167, 474/204, 249, 252, 272

[56] References Cited

U.S. PATENT DOCUMENTS

| | | | |
|---|---|---|---|
| 2,302,065 | 11/1942 | Siegling | 474/268 X |
| 2,724,974 | 11/1955 | Ayres | 474/205 X |
| 2,881,904 | 4/1959 | Hoerth | 474/205 X |
| 2,984,120 | 5/1961 | Hurry | 474/205 |
| 3,582,154 | 6/1971 | Russ | 474/205 X |
| 4,643,701 | 2/1987 | Meyer et al. | 474/205 X |
| 4,883,448 | 11/1989 | Kobayashi et al. | 474/268 X |
| 4,884,998 | 12/1989 | Miranti, Jr. | 474/205 |

FOREIGN PATENT DOCUMENTS

| | | | |
|---|---|---|---|
| 0165245 | 7/1989 | European Pat. Off. | |
| 999236 | 1/1952 | France | 474/205 |
| 1131174 | 2/1957 | France | 474/205 |

*Primary Examiner*—Rodney M. Lindsey
*Attorney, Agent, or Firm*—Robert W. Becker & Associates

[57] ABSTRACT

A flexible endless belt for full-track vehicles comprises a belt body made of an elastomeric material, and a longitudinal pull-resistant carrier embedded therein. The soil-engaging contact surface of the belt body is provided with projections while the inner surface flat for contacting the cylindrical mantle surface of rollers of the drive assembly. For the form-locking drive of such a belt and for achieving a vibration and noise reduced drive, the inner surface is provided with bending-resistant transverse stays that are embedded in the belt body and end flush with the edges of the inner surface of the belt. The inner surface is provided with longitudinally extending recesses before and after the transverse stays for engaging teeth provided at the drive roller.

11 Claims, 3 Drawing Sheets

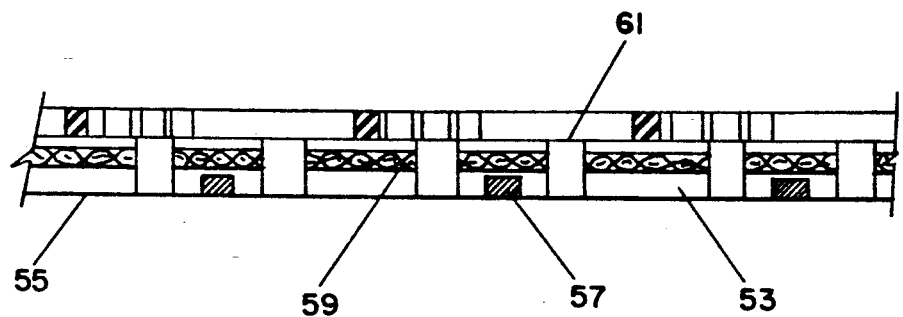
FIG—3
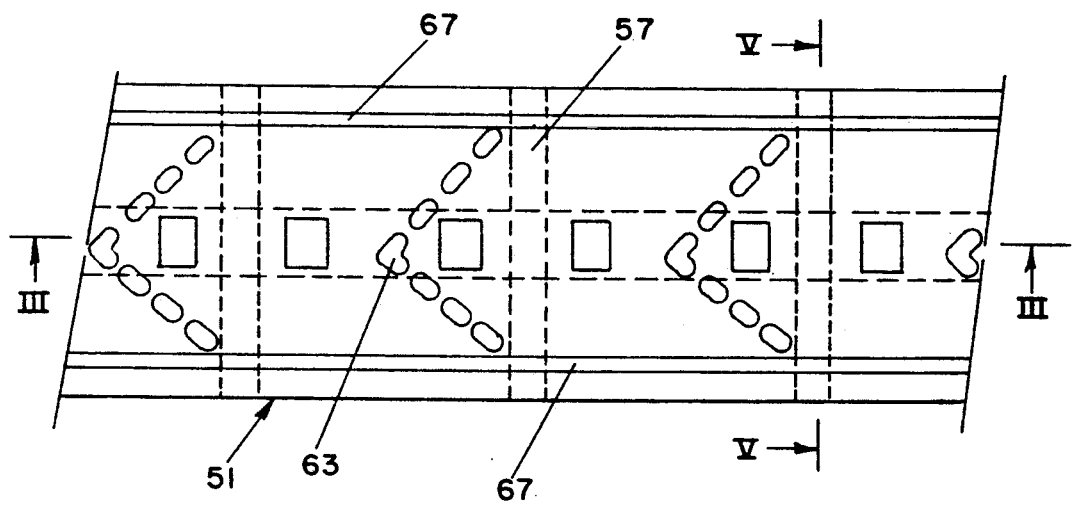
FIG—4
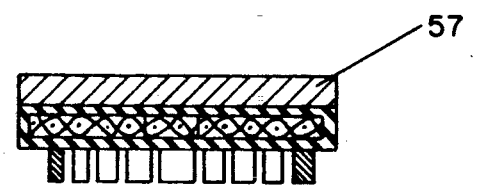
FIG—5

FLEXIBLE ENDLESS BELT FOR FULL-TRACK VEHICLE

The present invention relates to a flexible endless belt for full-track or caterpillar drive vehicles, for example caterpillar tractors for farming, transport vehicles or vehicles for earthwork, having a body made from elastomeric materials, whereby the inner cover layer of the body has a flat inner surface for contacting cylindrical mantle surfaces of rollers of the drive assembly, and whereby the outer cover layer of the body has a soil-engaging contact surface with projections. A longitudinal pull-resistant carrier means is disposed between the cover layers.

It is known from EP O 165 245 B1 to provide a full-track vehicle with a drive assembly or drive assembly that comprises a drive roller and guide rollers with a flexible endless belt looped around these rollers. The belt is driven in a frictional manner. In the presence of friction reducing materials, such as wet clay soil, the frictional connection between the drive roller and the belt may not be ensured so that the full-track vehicle may become inoperable.

In order to provide an operable drive on friction reducing soils for a full-track vehicle it is known to provide endless caterpillar chains which are driven in a form locking manner. These form-lockingly driven caterpillar chains, however, have the disadvantage that on solid ground higher speeds may not be reached since the guidance of the chain via a polygon results in substantial vibrations of the drive assembly.

When a farming vehicle is adapted by a drive assembly suitable for a belt instead of the commonly employed driving tire wheel, then the drive assembly usually forms a triangular structure with the upper end being the drive roller and the two other ends being the guide rollers whereby the guide rollers provide the contact surface of the drive assembly. Accordingly, it is only necessary to remove the driving tire wheel (rim and tire) from the drive assembly and to attach and fasten instead the drive assembly to the drive axle via the respective drive roller. The vehicle may thus be quickly changed over to a respective drive assembly if the respective soil so requires. Since the change-over must be performed at a designated mounting station, the vehicle must be moved over longer distances between the place of operation and the mounting station. Between the place of operation and the mounting station the ground is usually solid and higher driving speeds could be reached if the design of the vehicle so permitted.

The drive assembly in which the belt is guided around a triangular structure provides a smaller angle of the belt at the respective drive or guide rollers than a parallel belt guidance with two rollers. The frictional connection is thus substantially reduced. When additionally friction reducing soils are encountered, the full-track vehicle with a triangular drive assembly may not be operated successfully.

It is thus desirable that the belt be driven in a form looking manner, but at the same time maintain the advantageous smooth driving performance of a frictional drive which provides a vibration-reduced performance of the drive assembly even at higher speeds.

It is therefore an object of the present invention to provide a belt of the aforementioned kind which may be driven in a form-locking manner but, at the same time, provides a vibration and noise reduced operation of the drive assembly.

BRIEF DESCRIPTION OF THE DRAWINGS

This object, and other objects and advantages of the present invention, will appear more clearly from the following specification in conjunction with the accompanying drawings, in which:

FIG. 3 is a longitudinal cross-section of a belt of a different embodiment:

FIG. 4 shows a plan view of the soil-engaging contact surface of the belt according to FIG. 3;

FIG. 5 is a cross-sectional view of the belt according to FIGS. 3 and 4; and

SUMMARY OF THE INVENTION

Figure 1:
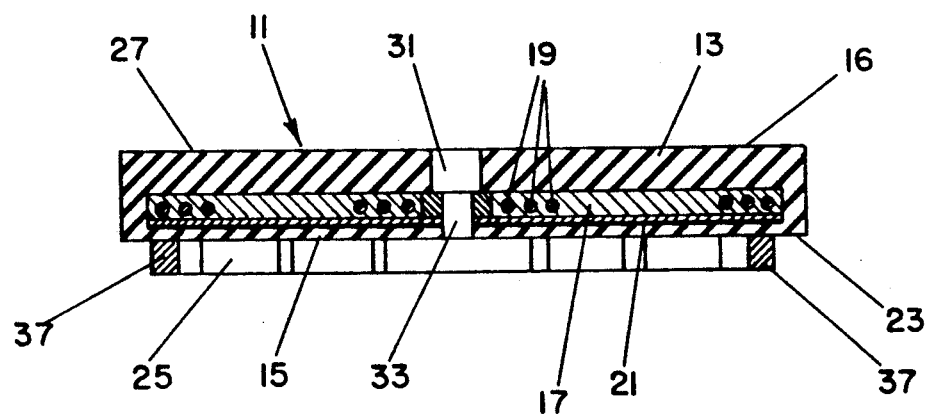
FIG. 1 shows a belt in a cross-sectional view having a pull-resistant carrier means made from steel cords.

The flexible endless belt for full-track vehicles according to the present invention is primarily characterized by bending-resistant stays that are embedded in the body of the belt at the inner surface thereof whereby the bending-resistant stays are extending perpendicularly to a longitudinal direction of the belt and end flush with the inner surface; and longitudinal recesses that are disposed before and after the bending-resistant stays.

The flexible endless belt is provided with a flat inner surface having no projections so that the mantle surface of the drive roller is completely engaged with the exception of the longitudinally extending recesses. The bending-resistant stays that are embedded in the belt body at the inner surface serve as an engaging means for a form-locking drive unit, for example, a toothed wheel at the drive roller. The recesses before and after the bending-resistant stays allow the engagement of the drive journals at a sufficient depth so that the flanks of the drive journals engage in a form-locking manner the bending-resistant stays. The bending-resistant stays provide a uniform force introduction over the entire width of the belt.

The drive journals which are rotating with the drive roller engage the bending-resistant stays and thus ensure a permanent form-locking drive contact. The advantageous smooth driving performance of the belt is maintained since the belt that is contacting the drive roller is also driven due to its frictional connection.

The elastic stretching of the belt allows that the force transmission is achieved via a plurality of teeth at the same time. With the caterpillar chains, that are also driven in a form-locking manner, only one of the drive journals is responsible for the force transmission at a given time.

In an advantageous embodiment of the present invention the pull-resistant carrier means is comprised of parallel steel cords, whereby an area of the longitudinal recesses is free of steel cords.

Steel cords have proven their reliability as embedded pull-resistant carrier means for elastomeric belts under pull-loads. The areas free of steel cords allow the arrangement of recesses for the engagement of the drive journals at the bending-resistant stays.

In a further preferred embodiment the pull-resistant carrier means comprises at least one fabric layer made of plastic material. The respective plastic fabric layers exhibit only little stretching during operation which results in advantageously small stretching lengths. The high breaking stress of the plastic fabric layers allows for short-term overloads, for example, during peak loads, without the belt being destroyed.

In further advantageous embodiments of the invention the steel cords are covered by a resilient transverse plastic cord layer. Between the bending-resistant stays, transverse reinforcement and mechanical stability of the belt are advantageously achieved. These transverse plastic cord layers are preferably made of polyamide.

In a further embodiment of the present invention the recesses form a longitudinal continuous groove. The drive journals that are rotated with the drive roller, preferably the teeth of a driving toothed wheel, engage the longitudinal groove already before the bending-resistant stays so that they make contact with their entire flank the sidewalls of the bending-resistant stays. The free space for the teeth prevents a working of the elastomeric material of the belt body.

In another embodiment the recesses are provided in the form of holes that penetrate the belt body, and they serve at the same time as discharging openings, for example, for wet clay soil.

It is preferable that the longitudinal groove is provided with openings before and after the bending-resistant stays, whereby the openings penetrate the belt body.

In a further embodiment the projections of the outer contact surface are arranged in a V-shaped configuration in a longitudinal direction of the belt. Furthermore the soil-engaging contact surface has strips disposed along edges thereof in a longitudinal direction of the belt. It is preferable that the bending-resistant stays are in the form of flat steel rods, having rounded edges in a plane of the inner surface.

The present invention provides a flexible endless belt for full-track vehicles which are suitable for a combination of a form-locking and frictional drive connection. The belt ensures a uniform driving contact due to its longitudinal flexibility. It is also possible to use the inventive belt with full-track vehicles on wet soil without the need for employing caterpillar chains.

DESCRIPTION OF PREFERRED EMBODIMENTS

The present invention will now be described in detail with the aid of several specific embodiments utilizing FIGS. 1 through 6.

Figure 2:
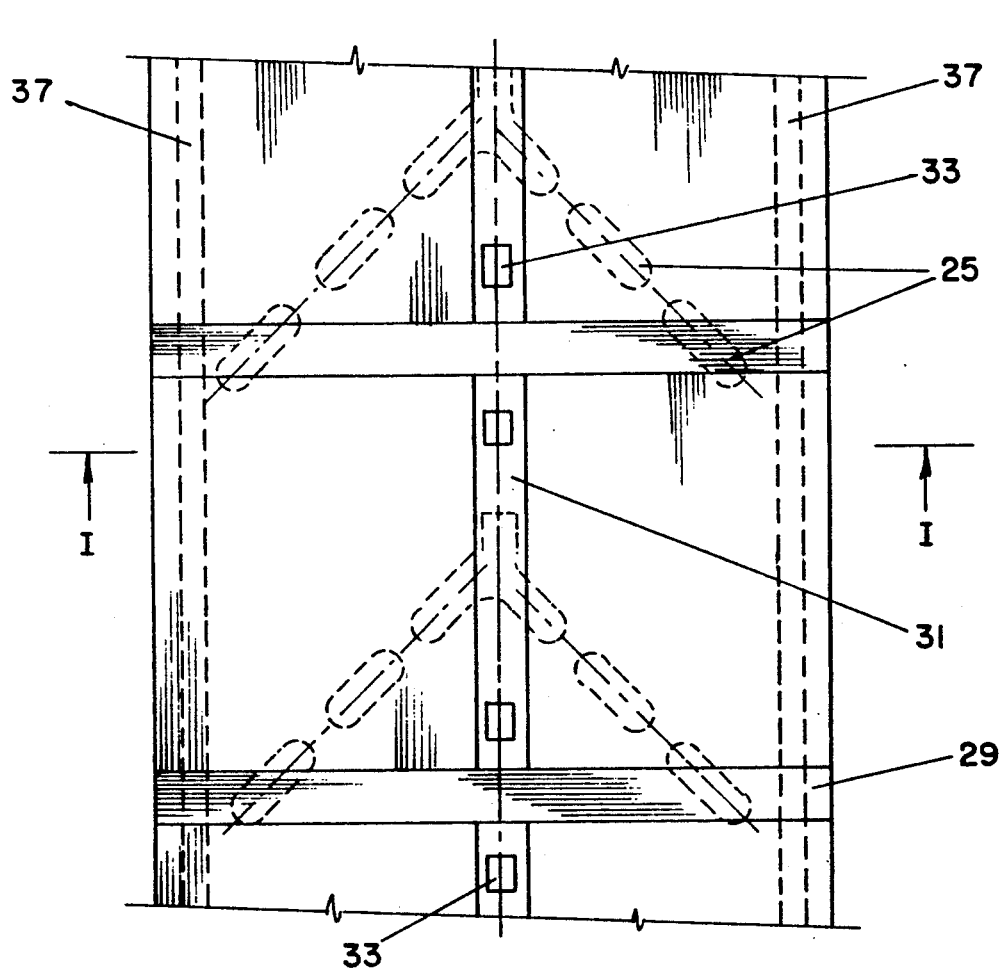
FIG. 2 is a plan view of the inner surface of the belt according to FIG. 1.

The belt 11 represented in FIGS. 1 and 2 comprises a body 13 consisting of an elastomeric material, for example, a wear-resistant rubber mixture. A pull-resistance carrier means 17 is embedded in the belt body 13 and is comprised of parallel steel cords 19. The steel cords 19 are covered by a transverse cord layer 21 made of polyamide which is also embedded in the belt body 13. The transverse polyamide cord layer 21 is facing the outer contact surface 23. The outer portion of the belt body 13 in the area 15 between the outer contact surface 23 and the polyamide cord layer 21 is thinner than the inner portion 16 between the steel cords and the inner surface 27. The soil-engaging outer contact surface 23 is provided with projections 25 arranged in a V-shaped configuration. The projections 25 are made of an elastomeric material and are vulcanized onto the contact surface 23.

Belts of the aforementioned kind are commonly manufactured by vulcanizing together two layers of elastomeric material with the intermediate layer of steel cords. It is possible to provide different elastomeric materials for the two layers that form the belt body.

Bending-resistant transverse stays 29 are embedded in the belt body 13 at the inner portion 16 and end flush with the inner surface 27. The transverse stays 29 are spaced at an equal distance from one another and are provided over the entire width of the belt 11 (FIG. 2). The inner surface 27 is provided with a continuous longitudinal groove 31 that extends between the transverse stays 29 along the longitudinal center of the belt. Before and after the respective transverse stays 29 the longitudinal groove 31 is provided with rectangular openings 33 which penetrate the belt body 13. In the area of the continuous longitudinal groove 31 the belt 11 is provided with a steel cord-free zone 35.

The soil-engaging outer contact surface 23 is provided with strips 37 that are disposed along edges of the contact surface 23 in a longitudinal direction of the belt. The strips 37 have at least the same height as the projections 25. Thus, the driving stability is increased on wet soils.

The modified embodiment of a belt 51 shown in FIGS. 3 to 5 is provided with bending-resistant transverse stays 57 in the inner portion 53 whereby the transverse stays 57 end flush with the edges of the inner surface 55 and are provided based at a uniform distance relative to one another. The transverse stays 57 are provided in the form of flat steel rods and are vulcanized into the inner portion of the belt body 53. The pull-resistant carrier means 59 is comprised of four polyester fabric layers that are arranged on top one another. The soil-engaging contact surface 61 shown in FIG. 4 is also provided with projections 63 made of a rubber material and arranged in a V-shaped configuration. Strips 67 made of rubber are provided parallel to the edges of the belt. The construction of the belt 51 corresponds to the construction of the belt 11 represented in FIGS. 1 and 2.

Figure 6:
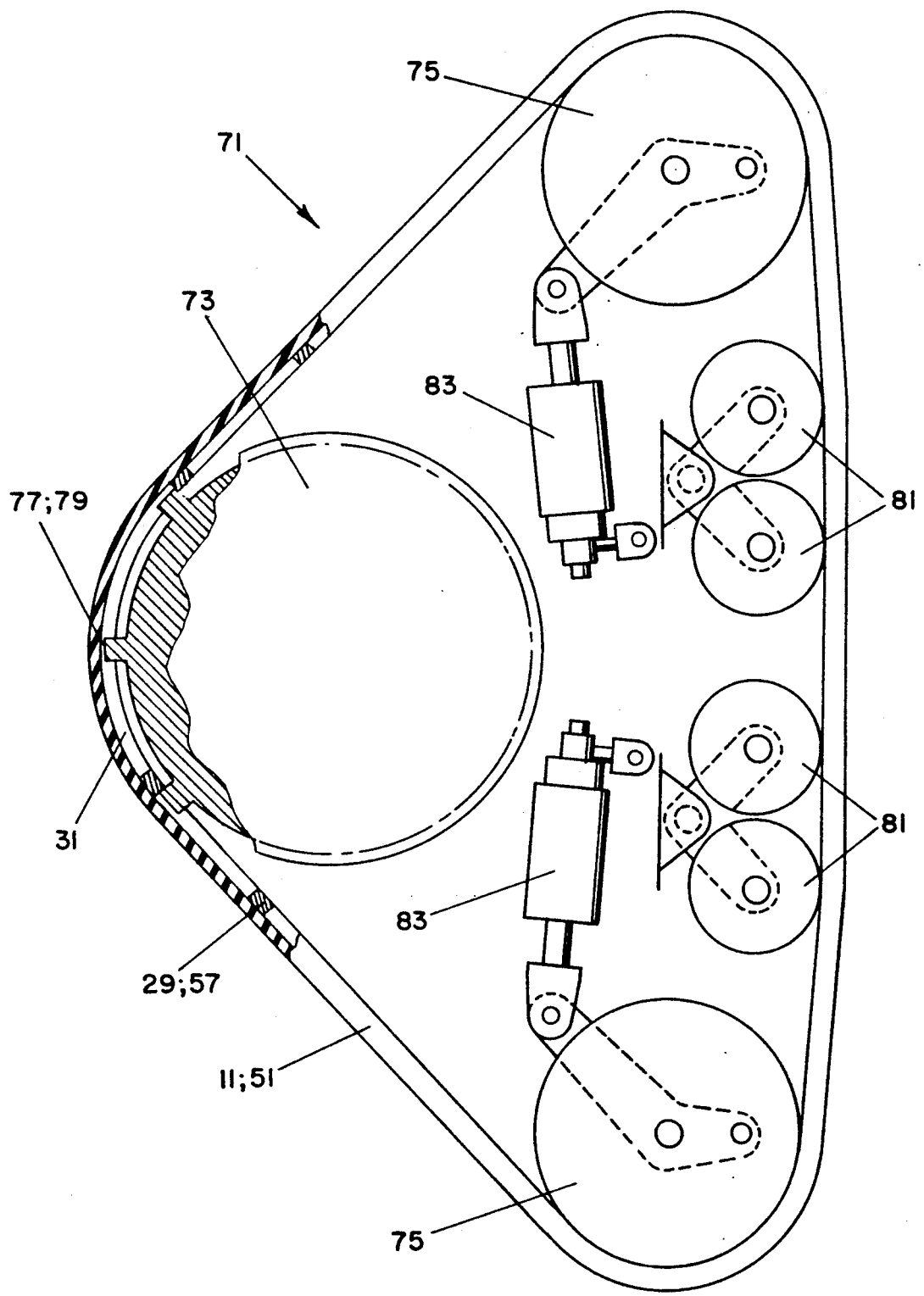
FIG. 6 is a schematic representation of an endless belt mounted on a triangular drive assembly with bending-resistant stays arranged within the inner cover layer.

FIG. 6 is a schematic representation of the arrangement of the belt 11 respectively 51, after being connected at respective ends to form an endless belt, on a drive assembly 71 in the form of a triangle. The drive axle of the drive assembly 71 is fixedly connected to a drive roller 73. The drive assembly 71 also comprises two guide rollers 75 which form the bottom corners of the triangle and the contact plane of the drive assembly 71.

The drive roller 73 is provided with a toothing 77 with teeth 79 extending past the contact mantle surface for the belt 11, 51. The circle section of the toothing 77 is flush with the contacting surface of the belts 11, 51 at the drive roller 73. The toothing 77 is disposed at a recess of the mantle surface of the drive roller 73 which is not shown in the drawing. The spacing between the teeth 79 of the toothing 77 corresponds to the distance between the transverse stays 29, 57.

Between the two guide rollers 75 support wheels 81 are provided. The drive assembly 71 is further provided with belt stretching devices 83 that engage the guide rollers 75.

The drive assembly 71 may be placed onto the drive axle of a drive unit with its drive roller 73 and, after being fastened securely to the drive axle, may be used instead of a common tire wheel.

The belt 11 respectively 51 is looped around the cylindrical drive roller 73 which, in its center portion, is provided with a toothing 77 that extends past the roller mantle surface and extends into the central longitudinal groove 31 of the belts 11, 51. The belts 11, 51 may be provided with guide means (not represented in the drawing) for longitudinally guiding the belts 11 and 51 such that the guide means are screwed onto the transverse stays 29, 57 and engage the teeth 79 of the toothing 77 with play. The guide means provide guidance for the belt in its longitudinal direction. The belt 11 respectively 51 is looped around the two guide rollers 75 and is guided over support wheels 81 that are arranged between the guide rollers 75.

In the area where the belt is looped around the drive rollers 73, two or three teeth 79 are engaging the transverse stays 29, 57 at all times during operation, thereby ensuring the form-locking drive connection. When the engagement between the tooth and the transverse stay is temporarily interrupted due to operational vibrations or play, the force transmission is then ensured via the additional frictional connection. The force transmission is equalized due to the longitudinal flexibility of the belt 11, 51. The equalized and more uniform driving performance results in a reduction of vibrations and noises and allows for the operation of the full-track vehicle on solid ground at higher speeds than commonly possible with full-track vehicles having caterpillar chains.

The present invention is, of course, in no way restricted to the specific disclosure of the specification and drawings, but also encompasses any modifications within the scope of the appended claims.

What we claim is:

1. In a flexible endless belt for full-track vehicles, said belt having a belt body made of an elastomeric material; said belt body having a flat inner surface for contacting cylindrical mantle surfaces of rollers of a carriage, a soil-engaging outer contact surface with projections, and a longitudinal pull-resistant carrier means embedded in said belt body, wherein the improvement comprises:

bending-resistant stays that are embedded in said belt body at said inner surface thereof, whereby said bending-resistant stays extend perpendicularly to a longitudinal direction of said belt and are flush with said inner surface; and longitudinal recesses that are disposed before and after said bending-resistant stays.

2. A flexible endless belt for full-track vehicles according to claim 1, wherein said pull-resistant carrier means comprises parallel steel cords, whereby an area of said longitudinal recesses is free of said steel cords.

3. A flexible endless belt for full-track vehicles according to claim 1, wherein said pull-resistant carrier means comprises at least one fabric layer made of plastic material.

4. A flexible endless belt for full-track vehicles according to claim 2, wherein said steel cords are covered by a resilient transverse plastic cord layer.

5. A flexible endless belt for full-track vehicles according to claim 4, wherein said resilient transverse plastic cord layer is made of polyamide.

6. A flexible endless belt for full-track vehicles according to claim 2, wherein said longitudinal recesses form a continuous longitudinal groove.

7. A flexible endless belt for full-track vehicles according to claim 2, wherein said longitudinal recesses are in the form of holes that penetrate said belt body.

8. A flexible endless belt for full-track vehicles according to claim 6, wherein said longitudinal groove is provided with openings before and after said bending-resistant stays, said openings penetrating said belt body.

9. A flexible endless belt for full-track vehicles according to claim 1, wherein said projections are arranged in a V-shape in a longitudinal direction of said belt.

10. A flexible endless belt for full-track vehicles according to claim 1, wherein said soil-engaging outer contact surface has strips disposed along edges thereof in a longitudinal direction of said belt.

11. A flexible endless belt for full-track vehicles according to claim 1, wherein said bending resistant-stays are flat steel rods having rounded edges in a plane of said inner surface.

* * * * *